United States Patent [19]

Scheuermann

[11] 3,987,819

[45] Oct. 26, 1976

[54] MIXING VALVE SYSTEM

[76] Inventor: Klaus Scheuermann, Unteres Plantahaus, CH 7524 Zuoz, Switzerland

[22] Filed: Mar. 17, 1975

[21] Appl. No.: 559,244

[30] Foreign Application Priority Data
Mar. 20, 1974  Germany............................ 2413420

[52] U.S. Cl........................ 137/637.3; 137/625.41; 137/636.2; 251/208
[51] Int. Cl.².................... F16K 11/18; F16K 11/22
[58] Field of Search................ 137/625.41, 625.46, 137/637.3, 637.5, 636.2; 251/208

[56] References Cited
UNITED STATES PATENTS

| | | | |
|---|---|---|---|
| 2,677,391 | 5/1954 | Chellberg.................... | 137/637.3 X |
| 2,860,661 | 11/1958 | Boegel........................... | 137/637.3 |
| 3,625,255 | 12/1971 | Genin............................. | 137/637.3 |
| 3,827,538 | 8/1974 | Morgan......................... | 137/637.3 X |

FOREIGN PATENTS OR APPLICATIONS

| | | | |
|---|---|---|---|
| 1,099,339 | 1/1968 | United Kingdom............ | 137/625.41 |

*Primary Examiner*—William R. Cline
*Assistant Examiner*—Richard Gerard
*Attorney, Agent, or Firm*—Woodhams, Blanchard and Flynn

[57] ABSTRACT

A mixing valve system for hot and cold liquids. A selectable temperature is controlled by mixing suitable parts of hot and cold liquid controlled by a plurality of disks having holes therethrough oriented in a particular manner to achieve the desired result. The system is composed of three stationary disks and two rotatable disks. Each rotatable disk is sandwiched between different pairs of the stationary disks. One rotatable disk controls the volume of flow and the other rotatable disk controls the amount of hot liquid that is to be mixed with the cold liquid.

10 Claims, 11 Drawing Figures

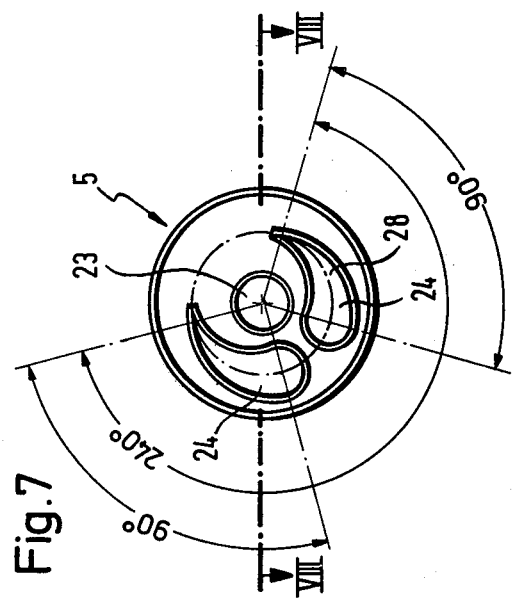
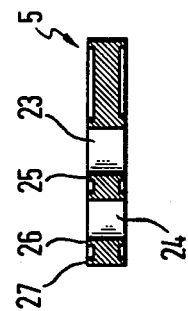
Fig. 7
Fig. 8
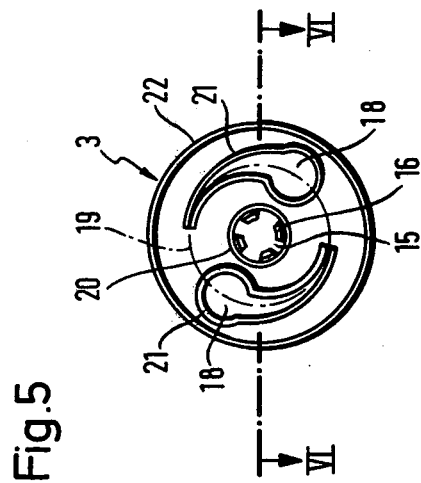
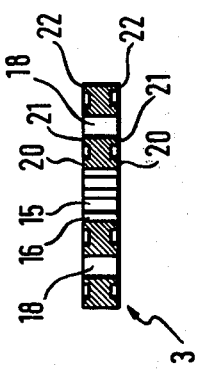
Fig. 5
Fig. 6

MIXING VALVE SYSTEM

FIELD OF THE INVENTION

The invention relates to a mixing valve system for the output of liquid in a selectable amount of throughflow of a temperature which can be chosen by mixing suitable parts of hot and cold liquid, having at least one stationary ceramic disk with inflow openings which are connected to inlets for the hot and the cold liquid, and having at least one rotatable disk of ceramic which rests sealingly and slidingly on the stationary ceramic disk having at least one throughflow opening.

BACKGROUND OF THE INVENTION

German Patent No. 1,282,395 discloses a rotary slide valve of this type, which operates according to the counterflow principle, namely the infeed and outlet openings are provided at the same point, seen from the ceramic plates. This known rotary slide valve has a housing which has the infeed and outlet openings and contains the stationary ceramic disk. A member which can be rotated in this housing holds the other ceramic disk, fixed with respect to rotation relative to it. Furthermore a mixing chamber exists in the body of revolution. The two ceramic disks have the same shape. They each have a central, circular opening and two circular openings arranged on a circle which is concentric with respect to the central opening, the connecting line of said circular openings forming an acute angle. This rotary slide valve operates as follows:

Cold or hot water flows in through suitable openings in the housing and the openings of the stationary ceramic disk which coincide therewith. The body of revolution permits the adjustment of the two openings of the swivel plate mounted in said body of revolution with its outer openings relative to the stationary swivel plate in such a manner that starting with the complete covering of the two inflow openings first one can select from one liquid, for example first the cold one, a continuously increasing flow volume until the complete coincidence of both openings. Upon further rotation the cross section of this opening is again reduced, at the same time a suitable cross section of the second opening is freed, so that now the other liquid, for example the hot one, flows in in a suitable amount. The mixing relationship changes during further rotation until the first opening is covered and the second one is completely free. The second opening can subsequently be reduced until it is completely covered. This means that controlling the amount of liquid is possible with the two existing ceramic disks, however, a mixture flows independently from the mixing relationship totally all together always at the highest possible amount through the two disks. This liquid reaches the mixing chamber in the body of revolution and in the opposite direction of flow through the central openings of the two disks and an outlet opening in the housing to the outside. A control of the amount for a mixed liquid takes place outside of the rotary slide valve in a manner which is not discussed in detail. The known rotary slide valve is expensive in its structure, since its housing and the body of revolution may have only very small dimensional tolerances, if the operation is not supposed to be affected. Furthermore additionaal seals are required in the housing and the body of revolution. To control the outflow amount additional devices are required.

Furthermore Offenlegungsschrift No. 1 550 060 discloses a mixing valve, which contains in an expensive housing system two ceramic disks, the one of which rests rotatably and movably on the other one. The movable disk has thereby an approximately oval opening, which, depending on the position on the disk, releases certain cross sections of two inflow openings for cold and hot liquid of the stationary disk for the temperature adjustment and a certain cross section of an outlet opening of the stationary disk for volume regulation. Also this mixing valve operates according to the counterflow principle, whereby the hole of the movable disk is connected to a suitable mixing chamber. The entire device is extraordinarily expensive to manufacture, because many individual parts, sealing elements, etc., must be manufactured and assembled with an high exactness of fit. The same is true for a mixing valve according to Offenlegungsschrift No. 1 949 318 of the same Applicant, which operates according to the same principle with slightly different, but not less expensive, designs.

The purpose of the invention is to produce a mixing valve system of the above-discussed type, which can be manufactured simply and inexpensively, which is economical in operation and can easily be operated.

SUMMARY OF THE INVENTION

This purpose is attained according to the invention by an arrangement of disks which rest directly on one another having a first stationary disk having inflow openings which are center-symmetrically opposite one another, a rotatable volume selector disk with two equally shaped center-symmetrically oppositely positioned throughflow openings of a shape tapering at least in one direction of rotation for the similar spanning of the inflow openings, and a second stationary disk with throughflow openings which are formed and arranged corresponding with the inflow openings of the first stationary disk, a temperature selector disk which is rotatable separately from the volume selector disk and has uniform throughflow openings which are arranged in mirror image to one another and have a shape which tapers in at least one direction of rotation, for a variable spanning of the throughflow openings of the second stationary disk, and a third stationary disk which has at least one outlet opening and has a connection to a discharge member of the mixing valve.

The inventive mixing valve system is very simple and thereby effectively constructed. The five adjoining disks form with their openings two throughflow channels for the hot or cold liquid. The liquids enter at one end into the mixing valve system and exit at the other end in selected and adjusted volumes. A mixing chamber is not required just like a separate outflow opening in the disks, which is necessary in the counterflow system, is not needed. The two throughflow channels are variable each at two points with regard to their cross section, whereby each change relates simultaneously to both channels in a manner adjusted to one another. When a first change in the volume selection is made both components are change in the same degree. Also the complete blocking of the throughflow takes place in this area. Only at the second point in direction of flow is the mixing relationship determined by changing the channel cross sections oppositely, which means the enlargement of the one cross section causes a reduction of the other cross section. In each case simple throughflow relationships are obtained for the respective liquid, since a flow reversal does not take place and a mixing chamber does not need to be filled. Accordingly, the structure of the system is economical. Operation is simple, because for both the volume and also the temperature selection only one rotary movement over a limited sector of a disk is necessary. Since the parts which move relative to one another consist of wear-resistant ceramic disks which due to their resting on one another easily seal one another, the inventive system has a long lifetime.

All disks of the mixing valve system can advantageously be cast together into a plastic block. The plastic block with the disks therein form a structural unit, which can be manufactured and installed economically. Neither an additional housing, nor connecting and pressed-on elements for the disks are needed. It is only necessary prior to the casting procedure, to hold the disks on one another at the distance necessary for sealing and until the plastic block has hardened. By aftershrinking the plastic, the necessary pressure is maintained. The necessary connections, and the operating members for the rotatable disks can also be cast in. The outer shape of the structural unit, namely the contours of the plastic block can be adjusted already during casting to all spatial situations of the intended installation places.

In a preferred embodiment, the throughflow openings of the volume selector disk have each a form which is tapered approximately uniformly on both sides of an imaginary centerline, which is part of a circle which is concentric with respect to the turning centerpoint of the disk. Each cross-sectional change takes place in this manner starting at the edge of the throughflow channel, so that as much as possible a central flow is maintained.

The same design can be chosen advantageously for the throughflow openings of the temperature selector disk, whereby the two throughflow openings are arranged with their wide ends at a small distance from one another facing one another so that the sector of the disk which they span is more than 180°. The shape of the throughflow openings is important because of what has already been said in connection with the throughflow openings of the volume selector disk. The spanned sector of a disk assures a mixing possibility and with a volume selector disk which is adjusted to small throughflow volumes.

Also the circularly approximately uniformly wide outflow opening of the third stationary disk, which outlet opening is advantageously concentric to the disk center, extends advantageously over more than 180°. It thus spans the throughflow openings of the first and second stationary disks and releases each throughflow cross section by an amount adjusted by the rotatable disks.

The outlet opening may advantageously be interruped by a cross bar which does not hinder the outflow of the two liquids. They mix above the third stationary disk. Its own rigidity is considerably increased by the interruption of the large outlet opening.

In a preferred embodiment, the rotatable disks have around their outer edge and around their throughflow openings sealing rims which project axially on at least one surface. The bearing surface to the next disk is thus considerably reduced, namely the contact pressure is stronger and the sealing effect greater. The high wear-resistance of the ceramic disks permits to utilize this effect.

BRIEF DESCRIPTION OF THE DRAWINGS

Exemplary embodiments of the inventive mixing valve systems are illustrated in the drawings, in which:

FIG. 5 is a top view of a volume selector disk,

FIG. 6 is a cross-sectional view along the line VI—VI of FIG. 5,

FIG. 7 is a top view of a temperature selector disk,

FIG. 8 is a cross-sectional view along the line VIII—VIII of FIG. 7,

DETAILED DESCRIPTION

Figure 9:
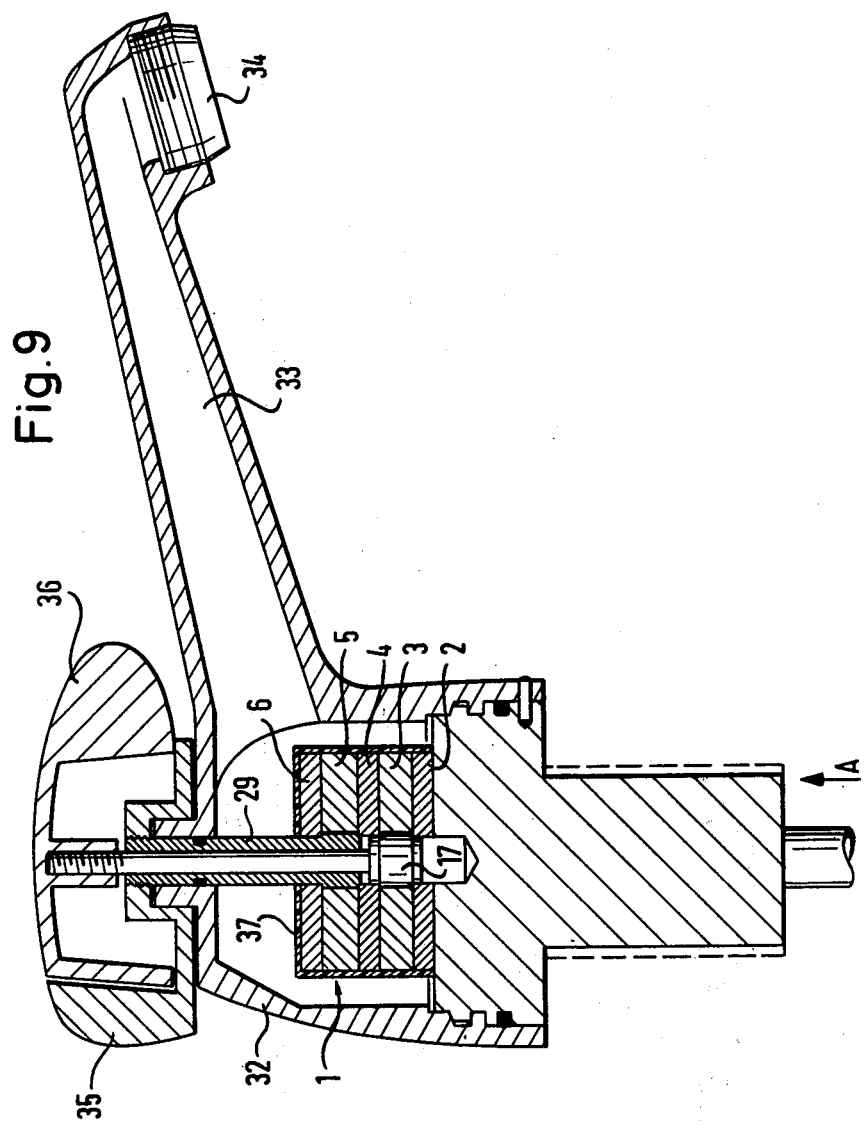
FIG. 9 is an installation example of a mixing valve system.
Figure 10:
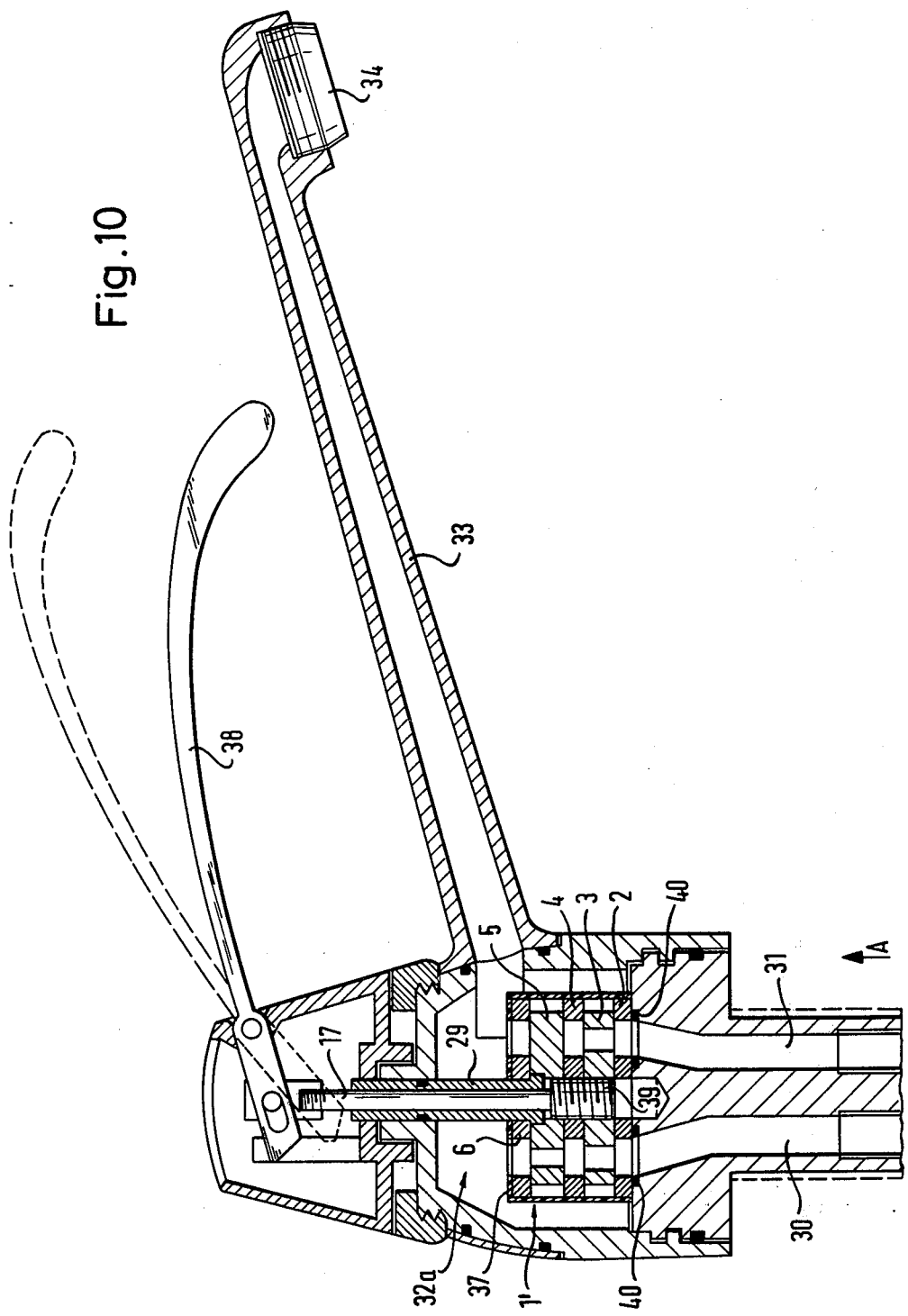
FIG. 10 is a further installation example of a mixing valve system.
Figure 11:
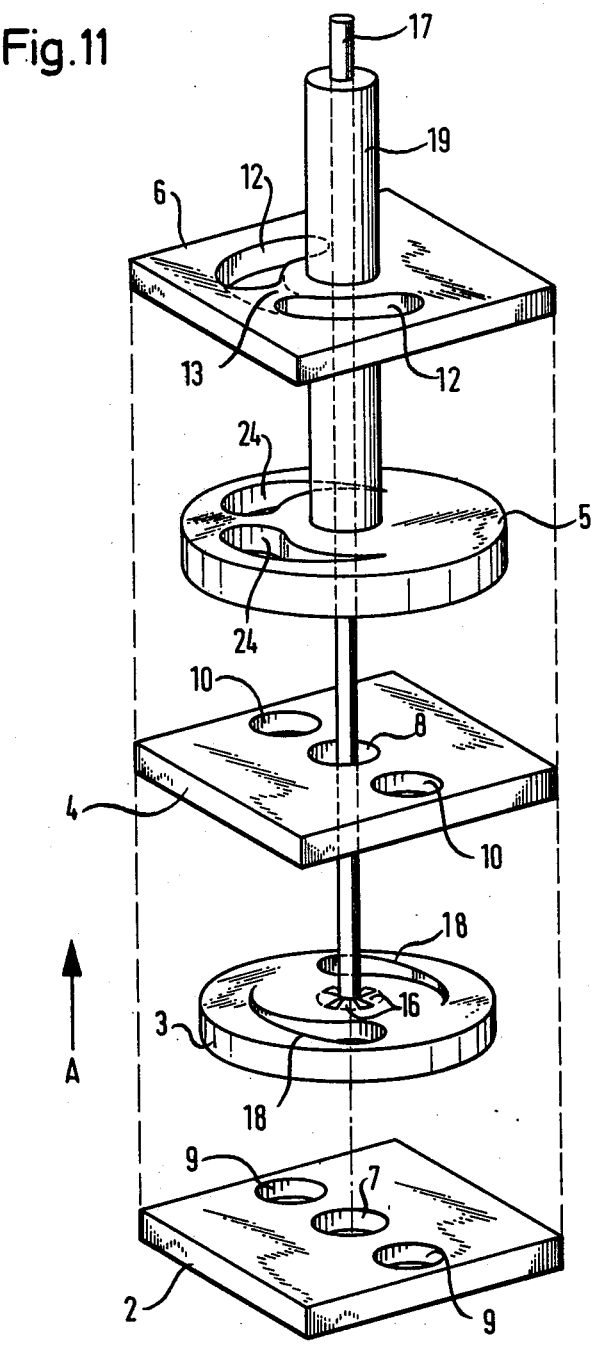
FIG. 11 illustrates the disks in an exploded arrangement.

FIGS. 9 and 10 show an inventive mixing valve system which is identified by reference numeral 1, or rather 1'. Each mixing valve system has five adjoining disks 2 to 6, namely one above the other in the following arrangement:

First stationary disk 2, rotatable volume selector disk 3, second stationary disk 4, rotatable temperature selector disk 5 and third stationary disk 6. FIG. 11 illustrates the disk arrangement in an exploded illustration. The five disks are pressed against one another under pressure and cast into a plastic block 37. The plastic block 37 is held in the valve housings by means of a Seeger-L-ring.

Figure 1:
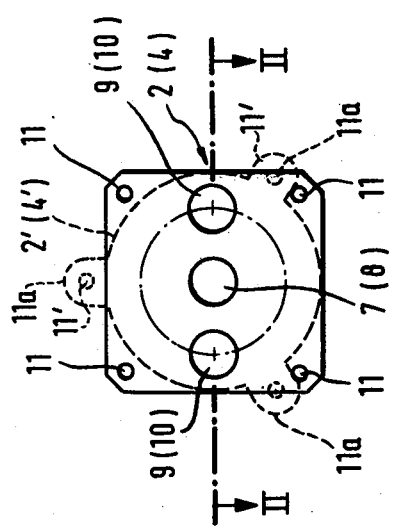
FIG. 1 is a top view of a first and second stationary disk.
Figure 2:
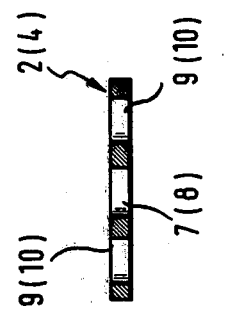
FIG. 2 is a cross-sectional view along the line II—II of FIG. 1.

FIGS. 1 to 8 illustrate individually the disks of the mixing valve system. The substantially square disk which is illustrated in full lines in FIG. 1 illustrates both the first stationary disk 2 and also the secondary stationary disk 4. The reference numerals which relate to the disk 4 are placed in parentheses in FIGS. 1 and 2. Both disks have a central hole 7 or 8. Inflow openings 9, or rather throughflow openings 10 lie opposite one another and are symmetrically positioned relative to the center hole 7 or 8 and lie on an imaginary circle which is indicated by a dash-dotted line and is concentric to said hole, each opening having a circular shape. Openings 11 exist in the corner zones of the disks 2 or 4. FIG. 1 futhermore shows in dashed lines an embodiment of disks 2' or 4' which are approximately circularly shaped and have three projections 11a which have openings 11' therethrough. The disks 2 or 4 have, as shown in FIG. 2, plane surfaces on both sides, of which, in the case of disk 2, at least one side, in the case of disk 4, both sides are superfinished.

Figure 3:
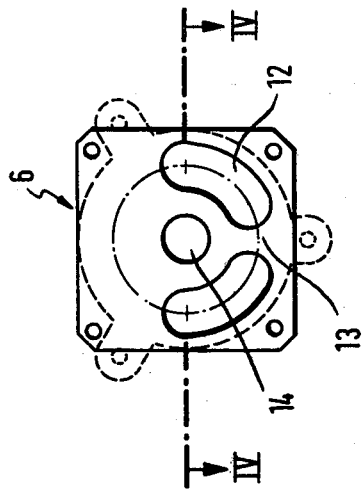
FIG. 3 is a top view of a third stationary disk.
Figure 4:
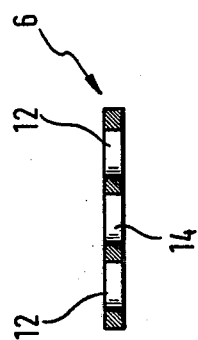
FIG. 4 is a cross-sectional view along the line IV—IV of FIG. 3.

FIGS. 3 and 4 illustrate the third stationary disk 6, wherein FIG. 3 illustrates two possible shapes, similar to the illustration in FIG. 1. The third stationary disk 6 has an outlet opening 12, which is divided into two openings by a cross bar 13. FIG. 11 indicates with dashed lines on the disk 6, how the outlet opening 12 runs without the bar 13. The opening 12 extends circularly over more than 180°, and has, aside from the rounded-off end zones and the bar area the same width all over. Furthermore, the disk 6 has a central hole 14. Also in the case of the disk 6, the surfaces are planar and at least one is superfinished.

FIGS. 5 and 6 illustrate the rotatable volume selector disk 3, which is constructed circularly. It has a center hole 15 having axial ribs 16 therein, which serve as coupling members for connection to an adjusting shaft 17 (FIGS. 9 to 11). Furthermore the volume selector disk 3 has two throughflow openings 18, which each have an approximately tear-shaped form. Each opening 18 extends along a theoretical center line, which is part of a circle 19 which is concentric to the disk centerpoint, which is indicated by a dash-dotted line in FIG. 5. The throughflow openings 18 are thereby constructed such that the outline points which lie opposite on another seen radically to the concentric circle 19, are each spaced equally from the "center line". The greatest width of each throughflow opening corresponds approximately to the diameter of the inflow openings 9 of the first stationary disk 2. The two surfaces of the volume selector disk 3 are recessed between the throughflow openings so that around the central hole 15, around the throughflow openings 18 and along the peripheral outer edge of the disk on both sides sealing rims 20 to 22 are formed (FIG. 6). The surfaces of the sealing rims 20 to 22 each lie in one plane and are superfinished.

The rotatable temperature selector disk 5 is illustrated in FIGS. 7 and 8. It has a central hole 23 and two throughflow openings 24. The central hole 23, the throughflow openings 24 and the outer edge of the temperature selector disk are surrounded on both disk surfaces by sealing rims 25, 26 and 27, similar to the volume selector disk 3. The throughflow openings 24 each have approximately a tear-shape and extend each along a theoretical centerline, which is a part of a cicle 28 which is concentric to the centerpoint of the disk. This circle is illustrated by a dash-dotted line in FIG. 7. The throughflow openings 24 are thereby arranged such that their widest points face one another and are only a small space from one another. The sector of the disk 5 which is occupied by the throughflow openings between their two acutely tapered ends, including the space between their wide ends, extends over approximately 240°.

The exploded illustration in FIG. 11 shows how the individual disks are associated with one another in the mixing valve system. The arrow A illustrates thereby just like in FIGS. 9 and 10 the flow direction of the liquid. The throughflow openings 9 and 10 of the stationary disks 2 and 4 are in alignment. The outlet opening 12 of the third stationary disk 6 extends with its two free ends over the throughflow openings 10 of the disk 4, while the bar 13 is above a nonperforated area of the disk 4. The volume selector disk 3 is rotatably supported between the first and the second stationary disk 4 on the adjusting shaft 17, the temperature selector disk 5 between the second stationary disk 4 and the third stationary disk 6, keyed with a hollow shaft 19. This can be seen particularly from FIGS. 9 and 10. How the disks, which are cast pressed against one another into a plastic block, cooperate will be explained hereinafter in connection with FIGS. 9 to 11. FIG. 10 shows how the inflow openings 9 of the stationary disk 2 which are here only indicated by their centerline, are connected to a inlet 30 for cold and an inlet 31 for hot liquid. The connection points are surrounded by gasket rings 40. The amount of liquid to be given out is adjusted by rotating the volume selector disk 3. Relative positions between the volume selector disk 3 and the stationary disk 2 are thereby possible, at which positions the disk 3 completely covers the inflow openings 9 and does not permit any liquid to reach the throughflow openings 18. By rotary movements of the volume selector disk 3 into one or the other direction, it is possible to gradually move the throughflow openings 18 over the inflow openings 9, whereby they each form greater throughflow cross sections. Both inflow openings 9 leave thereby, due to the center-symmetrical arrangement of the throughflow openings 18, each free an equal cross-sectional area. This throughflow zone extends then with the same cross section also through the second stationary disk 4, the throughflow openings 10 of which are covered or released in the same manner by the throughflow openings 18. Thus up to the upper side of the second stationary disk 4 a chosen throughflow amount of cold and an equal amount of hot liquid is able to flow. The temperature selector disk 5 cannot assume any position above the second stationary disk 4, which blocks the entire liquid flow. It can, however, selectively entirely cover one throughflow opening 10 of the stationary disk 4, for example the one for hot liquid, and can completely release the other throughflow openings, for example the one for cold liquid. The amount which flows through this cross section is determined by the setting of the volume selector disk. By a rotary movement of the temperature selector disk, at which the throughflow opening 24, which has released the throughflow opening 10, moves on with its tapering area over this throughflow opening and thus reduces the throughflow cross section for the cold liquid, the second throughflow opening 24 with its most narrow zone is moved ahead over the other throughflow openings, which frees the inflow possibility for hot liquid. The throughflow cross sections for the hot or cold liquid change thereby in a contrary sense in such a manner that the cold liquid has its throughflow cross section restricted so much as to give free flow at the same time to the hot liquid. Thus the amount flowing through and past the disk 5 remains constant. The outlet opening 12 of the third stationary disk 6 cooperates thereby with the throughflow openings 24 of the temperature selector disk in such a manner, that each throughflow cross section released by same is also released by it. The outflowing liquid chosen as desired in amount and temperature passes from the throughflow opening 12 into a housing 32 of a wash-stand preselection valve, as is shown in FIG. 9, and from there through an outlet 33 having a jet regulator 34 at the end to the outside or, as is shown in the installation example of FIG. 10, into a housing 32a of a single-lever valve, which has also an outlet 33 having a jet regulator 34 at the end.

FIGS. 9 to 11 illustrate the volume selector disk 3 and the temperature selector disk 5 having plane surfaces without gasket rings. This type of construction is possible in addition to the one shown in the individual illustrations of the disks having sealing rims.

In the operation of the installation example of FIG. 9, which shows a wash-stand preselector valve, a selector 35 first adjusts through the hollow shaft 29, the temperature selector disk 5. Subsequently, a control handle 36 is operated, which, through the adjusting shaft 17, rotates the volume selector disk 3 and therewith releases the desired amount of flow. In the installation example of FIG. 10, which shows a single lever valve, the temperature is chosed by pivoting a lever 38 about a vertical axis, the amount or volume is chosen by raising and lowering this lever. The up and down lever movement is used in combination with a thread arrangement 39 on the shaft 12 the disk 3 will be rotated in response to a vertical movement of the shaft 12.

The invention is not limited to the exemplary embodiments. Thus gasket rings may be mounted around the holes in the stationary disks when the rotatable disks have plane surfaces. Furthermore the stationary disks can be constructed like in the exploded illustration without outside openings 11, and can be held together temporarily under pressure by outside means during casting into the plastic block 37. However, they may also have, like in the individual illustrations of the stationary disks (FIGS. 1 and 3), openings in their corner areas, or projections and may be screwed together prior to the casting. The central hole in the volume selector disk may have in place of axial ribs an internal hexagon shape.

In place of ceramic disks one may also use glass disks or disks of other material which can rest sealingly on one another and at the same time be movable. Furthermore inventive mixing valve systems are suited for various armatures. FIGS. 9 and 10 illustrate only arbitrarily chosen installation examples.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A mixing valve system for the ouput of liquid in a selectable amount of outflow of a temperature which can be chosen by mixing suitable parts of hot and cold liquid, having at least one stationary ceramic disk with inflow openings therein which have a fluid connection with inlets for hot and cold liquid, and having at least one rotatable ceramic disk which rests sealingly and slidingly on the stationary ceramic disk having at least one throughflow opening, comprising an arrangement of disks which lie directly on one another having:
   a. a first stationary disk having inflow openings which are center-symmetrically opposite one another, a rotatable volume selector disk having two equally shaped center-symmetrically oppositely positioned throughflow openings of a shape tapering at least in one direction of rotation for the similar spanning of the inflow openings,
   b. a second stationary disk having throughflow openings which are formed and arranged corresponding with the inflow openings of the first stationary disk,
   c. a temperature selector disk which is rotatable separately from the volume selector disk and has at least two uniform throughflow openings which are arranged in mirror image to one another and have a shape which tapers in at least one direction of rotation, for a variable spanning of the throughflow openings of the second stationary disk, and
   d. a third stationary disk which has at least one outlet opening and has a fluid connection with a discharge member of the mixing valve.

2. A mixing valve system according to claim 1, wherein all disks of the mixing valve system are cast together as a unitary assembly by means of a plastic housing.

3. A mixing valve system according to claim 1 wherein the throughflow openings of the volume selector disk each have a form which is tapered approximately uniformly on both sides of a theoretical centerline, which is part of a circle which is concentric with respect to the turning centerpoint of the disk.

4. A mixing valve system according to claim 3, wherein the throughflow openings have approximately the shape of a tear shape cross section.

5. A mixing valve system according to claim 1, wherein the throughflow openings of the temperature selector disk each have a form which is tapered approximately uniformly on both sides of a theoretical centerline, which is part of a circle which is concentric with respect to the turning centerpoint of the disk, and wherein the two throughflow openings have their wide ends facing one another at a small distance from one another and arranged such that the sector of the disk which they span is more than 180°.

6. A mixing valve system according to claim 5, wherein the throughflow openings have approximately the form of a tear-shaped cross section.

7. A mixing valve system according to claim 1, wherein the third stationary disk has an approximately uniformly wide outflow opening, which extends concentrically to the center of the disk circularly over a sector of the disk more than 180°.

8. A mixing valve system according to claim 7, wherein the outflow opening is interrupted by a cross bar.

9. A mixing valve system according to claim 1, wherein the volume selector disk is coupled with an adjusting shaft and the temperature selector disk with a hollow shaft containing the adjusting shaft and wherein all disks have a center hole for the shafts.

10. A mixing valve system according to claim 9, wherein the rotatable volume selector and temperature selector disks have sealing rims projecting at least on one side around their outer edge, around their throughflow openings and their central holes.

* * * * *